United States Patent [19]

Longerich et al.

[11] 3,803,542

[45] Apr. 9, 1974

[54] MOVING TARGET INDICATOR FOR SONAR AND FREQUENCY MEASURING MEANS THEREFOR

[75] Inventors: Ernest P. Longerich, Chatsworth; Erland W. Rudy, Granada Hills, both of Calif.

[73] Assignee: The Bendix Corporation, North Hollywood, Calif.

[22] Filed: Sept. 26, 1967

[21] Appl. No.: 670,733

[52] U.S. Cl. ............................. 340/3 R, 340/3 D
[51] Int. Cl. ............................................ G01s 9/66
[58] Field of Search ................ 340/3, 3 D; 343/7.7

[56] References Cited
UNITED STATES PATENTS
2,821,694  1/1958  Sebring ................................. 340/3

*Primary Examiner*—Richard A. Farley
*Attorney, Agent, or Firm*—Robert C. Smith; Plante, Arens, Hartz and O'Brien

[57] ABSTRACT

A sonar receiving system is described including a receiver and a detector for supplying a brightness signal to a cathode ray tube, the system including a circuit for preventing the display of received signals whose carrier frequencies have less than a minimum doppler shift. The system includes a frequency measuring system system having a monostable multivibrator, a time constant circuit and a bistable multivibrator having a differential output for producing output signals varying with the difference between the transmitted carrier frequency and the instantaneous received signal frequency, an amplifier for amplifying said output signals, a feedback loop connecting part of the amplified signals to said time constant circuit, a threshold gate for passing only those signals representative of velocities of reflecting objects below a threshold value. A special low pass filter is supplied including a capacitor which tends to receive a charge in proportion to the output of the video detector and a transistor which is connected to said capacitor and which responds to signals from the threshold gate to discharge said capacitor to prevent a brightness signal from reaching the cathode ray tube, such that only signals representing velocities above said threshold are displayed.

10 Claims, 4 Drawing Figures

MOVING TARGET INDICATOR FOR SONAR AND FREQUENCY MEASURING MEANS THEREFOR

CROSS REFERENCES TO RELATED APPLICATIONS

U.S. application Ser. No. 612,734 filed Jan. 30, 1967, now U.S. Pat. No. 3,384,818 — SYSTEM FOR DETECTING AND MEASURING DOPPLER FREQUENCY VARIATION IN A SINGLE PULSE OF ALTERNATING CURRENT — Ernest P. Longerich, Donald J. O'Brien and Erland W. Rudy.

BACKGROUND OF THE INVENTION

This invention relates to sonar systems and more particularly to a frequency measuring technique used in a sonar system to aid in distinguishing reflections received from moving objects from those emanating from stationary objects. Because of the relatively slow rate of propagation of sonic energy in water, the usual techniques employed in radar for sensing moving targets, such as those involving the comparison of one input pulse (or oscilloscope sweep) with the next, are not practicable. It has been found that the most satisfactory way of sensing velocity of a moving object is to provide a means which is capable of sensing frequency variations, as a result of doppler effect, occurring in a single received pulse of significant length or duration. Thus, a sonar pulse may be of the order of 30 milliseconds in length, consisting of a substantial number of cycles of the carrier frequency which may be of the order of 10 kilocycles. Within the 30-millisecond return pulse, variations in frequency of the carrier may be sensed to provide an almost instantaneous indication of a moving target. This general technique is described in the above-identified copending application Ser. No. 612,734, now U.S. Pat. No. 3,384,818 but the means described in said application for providing the target velocity indication are quite different from that described herein, and involve the use of a relatively large and heavy delay line. The size and weight of such equipment, especially for airborne use, constitutes an obvious disadvantage, and the system described herein makes it possible to measure frequency variations in a single return pulse without requiring components of excessive size and weight.

SUMMARY

The system described herein includes a transducer for receiving underwater acoustic signals and for converting these to electrical signals. The electrical output from the transducer is processed through a receiver before being connected through a detector circuit and a low pass filter to a cathode ray tube. The signal entering the receiver includes, in addition to undesirable noise, a series of pulses made up of a large number of cycles of a carrier frequency. Although the signal is subjected to some refining in the receiver to improve the signal-to-noise ratio which is discussed below, it may be considered that the transducer output is essentially that which is supplied to a limiter amplifier. This amplifier, by a clipping process, removes the amplitude variation of the signal and presents a constant amplitude signal to the frequency measuring circuit.

A basic part of the frequency measuring circuit is a monostable or "one-shot" multivibrator which is connected into a frequency determining circuit whose nominal response rate corresponds to the carrier frequency. This circuit has no inherent tendency to oscillate as does a typical free running oscillator, but produces an output only when it receives a "trigger" pulse from the limiter amplifier. The duration of the pulse output from the "one shot" is controlled by the frequency-responsive circuit including a capacitor which charges at a desired rate. If the carrier frequency is lowered because of a doppler effect indicating a reflecting object is receding, these pulses will occur less frequently. If the frequency is increased, indicating the object is approaching, the pulses will occur more frequently. The pulse output of the "one shot" multivibrator is connected to a bistable multivibrator where it is differentially compared with the instantaneous carrier frequency, and this output is supplied to an amplifier whose input and output are modulated and demodulated in synchronism such that the output of the demodulator comprises an amplified direct current whose amplitude and polarity vary with the magnitude and direction of the departure of the instantaneous signal frequency from the nominal carrier frequency. A feedback loop connects a portion of this output back to the time constant circuit in the "one shot" multivibrator to increase or decrease the pulse width of the output pulses in proportion to the frequency. As a result, the total energy level, as reflected in both pulse width and frequency, varies with the frequency variations due to doppler effect in the carrier appearing at the transducer. This output is supplied to a threshold gate which separates out signals representing the velocities in excess of a given amount such as 3 knots. Signals passing this gate are supplied to a filter circuit having a resettable time constant which controls the application of the receiver video output to the cathode ray tube. Thus the arrangement permits only signals representing objects having velocities and extended length above a given amount to be represented on the cathode ray tube. It provides a clear indication of moving objects while discriminating effectively against stationary objects and a high percentage of the noise usually encountered. The system does not require unusually large and heavy components to effect the desired discrimination. A further advantage is that the use of the monostable multivibrator avoids frequency errors which would tend to be introduced through the use of a free running oscillator having a definite center frequency. It locks more readily to the incoming signal, and phase lock is more readily acquired.

DESCRIPTION OF PREFERRED EMBODIMENT

Figure 1:
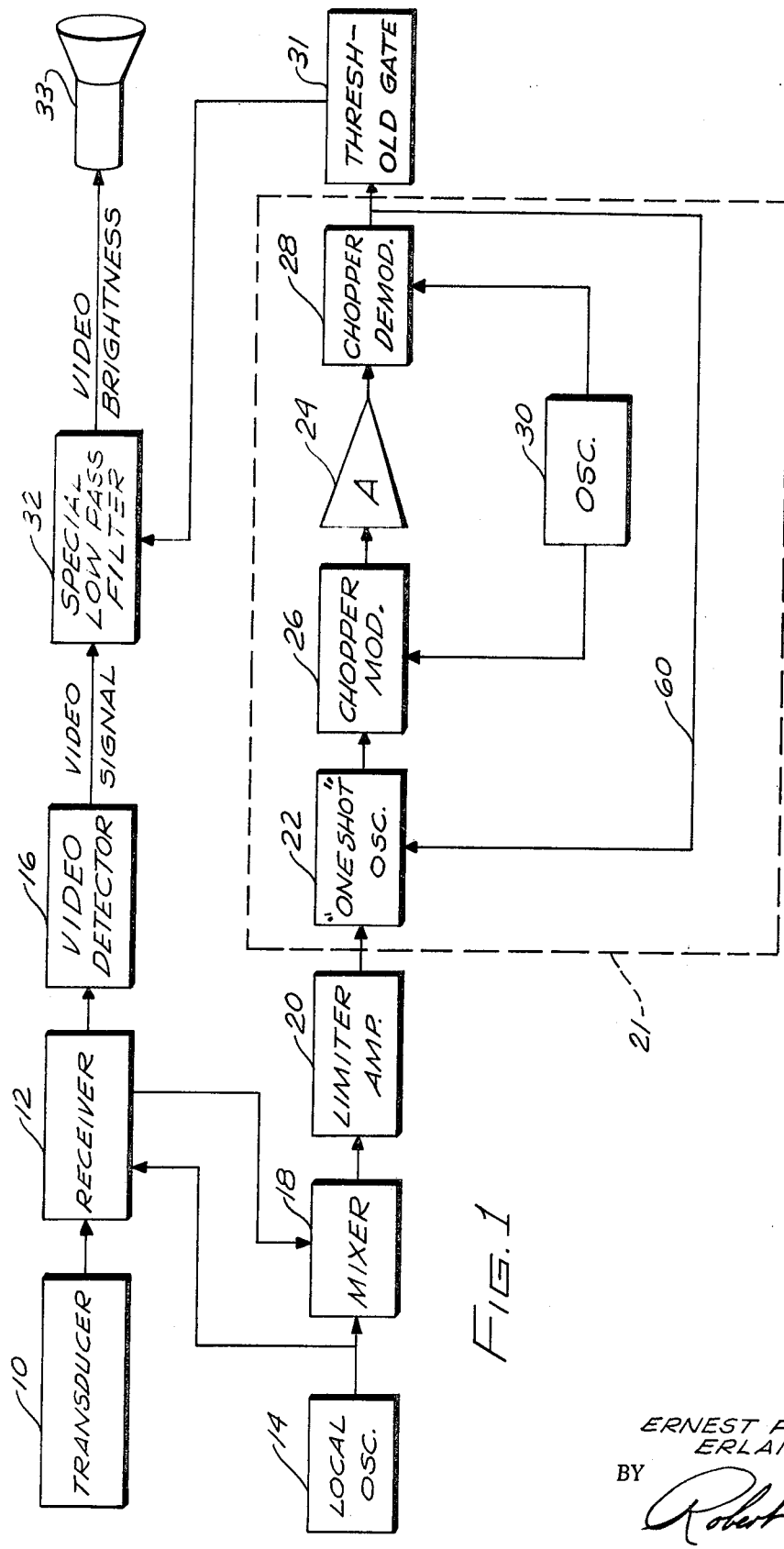
FIG. 1 is a block diagram showing the receiver portion of a sonar system and a moving target indicating system utilizing our invention incorporated into the receiver.

Referring now to the block diagram of FIG. 1, a receiving transducer appears at numeral 10 which receives acoustic signals and converts said signals into electrical signals. A typical transmitted sonar signal may consist of a series of pulses of the order of 3 to more than 100 milliseconds in length and made up of a large number of cycles at the carrier frequency which may be of the order of 10 kilocycles/second (kHz). These signals are supplied to a receiver 12 where they are heterodyned together with a signal from a local oscillator 14 to produce an intermediate frequency. In the receiver, the electrical input signal is subjected to automatic gain control action as well as the operation of a band pass filter which limits the response to the transmitted frequency plus and minus the frequency variations corresponding to the doppler variation resulting from the maximum velocity with which the system is concerned, e.g., 30 knots. Elimination of frequencies outside this band eliminates a substantial amount of noise. The heterodyned signal, as modified, is then supplied to a video detector 16 and to an additional mixer 18 which is connected to local oscillator 14. Mixer 18 restores the signal to its original carrier frequency, but with more uniform amplitude and with the frequencies outside the pass band of the above described filter eliminated. This restored signal is supplied to a limiter amplifier 20 which converts the alternating current of the carrier to an amplitude limited pulse signal of the same frequency. Alternatively, the signal from transducer 10 could be supplied directly to limiter 20 if the signal-to noise ratio is adequate.

The pulse output from the limiter 20 appears at the input of a frequency measuring circuit including a monostable or "one shot" multivibrator oscillator 22 and an amplifier 24 having its input and output modulated and demodulated by choppers 26 and 28 driven in synchronism by means of an oscillator 30. The output of the demodulator 28 is supplied to a threshold gate 31 which passes only signals representing velocity values above an adjustable threshold value such as 3 knots. The output of the threshold gate 31 controls the brighten signal in the special low pass filter 32 such that only signals representing bona fide moving objects cause a spot to brighten on the cathode ray tube 33.

Figure 2:
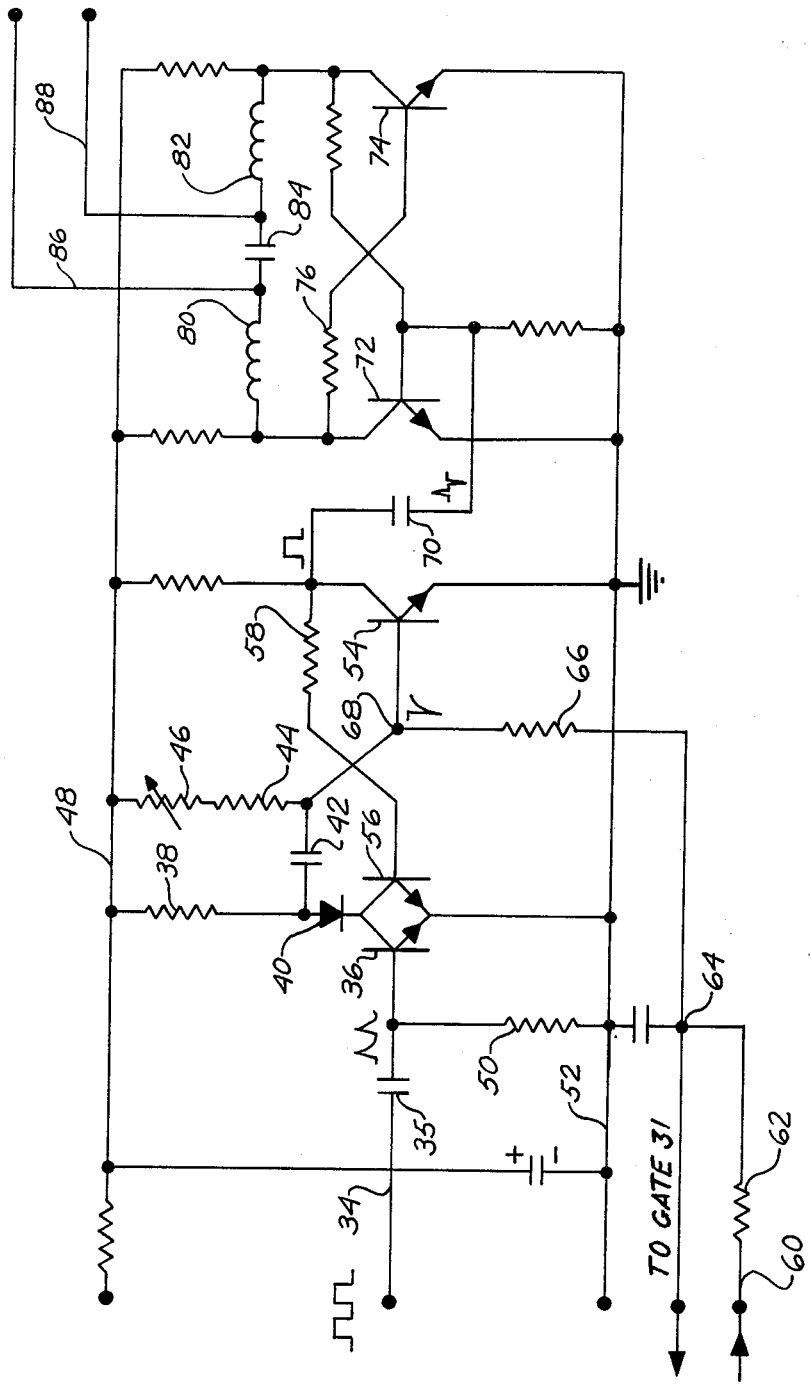
FIG. 2 is a schematic drawing of a frequency discrimination circuit in accordance with our invention.

The nature and organization of the frequency discrimination circuit 21 and particularly the monostable multivibrator 22 will become apparent from considering FIG. 2. The pulse output from the limiter amplifier 20, which is the same frequency as the acoustic signal received at the transducer 10, appears on an input lead 34 where it is supplied across a capacitor 35 to the base of a transistor 36. Capacitor 35 converts the pulse input to a series of sharp peak signals which cause the normally nonconducting transistor 36 to conduct. It also serves as a conventional coupling capacitor.

Transistor 36 is connected in a grounded emitter configuration to a direct current power source through a conventional collector resistor 38 and a temperature-compensating diode 40. The period of conduction of transistor 56 is controlled by a time constant circuit consisting of a capacitor 42, a resistor 44 and a variable resistor 46 also connected to the direct current source on conductor 48. With this arrangement, after transistor 56 turns off, the capacitor 42 is normally charged at a rate controlled by the resistances of resistors 44 and 46. Base bias for transistor 36 is provided by a resistor 50 connected to a ground line 52. When a trigger pulse reaches the base of transistor 36, it triggers the "one-shot" multivibrator circuit by connecting one side of capacitor 42 to ground which couples this negative going step voltage to the base of transistor 54. During this period of conduction, the base bias on a normally conducting transistor 54 is effectively removed, which then stops conducting current, resulting in an increased voltage at its collector. Since this collector is connected to a transistor 56 through a resistor 58, the increased voltage on the base of transistor 56 causes transistor 56 to conduct. This conduction continues until capacitor 42 is discharged, at which time the base bias is restored on transistor 54, and it again begins to conduct.

The feedback signal from chopper demodulator 28 (FIG. 1) is supplied to the monostable multivibrator oscillator 22 through a lead 60, to a resistor 62, to a junction 64, and through a resistor 66 to a junction 68 common to the base circuit of transistor 54 and one terminal of capacitor 42. This demodulated feedback signal is a direct current having one polarity if the input signal to the transducer is higher in frequency than that resulting from the values of capacitor 42 and resistors 44 and 46, and the opposite polarity if the input signal is lower in frequency than that established by capacitor 42 and resistors 44 and 46. A positive signal from the demodulator 28 appearing at junction 68 would cause capacitor 42 to charge at a faster rate, thereby effectively increasing the output frequency of the oscillator 22. Similarly, a negative signal appearing at junction 68 would reduce the rate at which a charge can build up on capacitor 42, and an effective lowering of the frequency of the "one shot" oscillator 22 results.

The voltage at the collector of transistor 54 appears as a series of rectangular pulses which are differentiated by a capacitor 70 such that sharp positive pulses are produced by the positive going edge of the rectangular pulses and sharp negative pulses by the negative-going edges. These sharp voltage peaks appear on the base of a transistor 72 which forms part of a bistable multivibrator circuit such that transistor 72 is caused to conduct by the positive peaks. Conduction of transistor 72 results in biasing a transistor 74 to conduction through a resistor 76. Transistor 72 is turned off by the subsequent negative going peak which results in shutting transistor 76 off shortly thereafter. As a result of this multivibrator action, a series of equal but opposite (as to each other) pulses appear across the inductors 80 and 82, but which vary as to their duration when the output of the "one shot" oscillator is different from the carrier nominal frequency. The average voltage differential appears across a capacitor 84 and is supplied to the chopper demodulator 28 by means of a pair of leads 86 and 88. The multivibrator output should be essentially the same as that appearing at the collector of transistor 54, but is advantageous in that it provides a buffering action which protects the frequency determining circuit from being loaded by circuits downstream; it affords better stability by separating the frequency determining elements from those measuring symmetry; and by using both sides of the multivibrator it provides better sensitivity.

Since the essentially direct current output measured between leads 86 and 88 is normally quite low in amplitude, it is desirable that it be amplified. This is accomplished by a conventional chopper modulator-demodulator arrangement used in combination with an amplifier 24. As described above, the modulator 26 and demodulator 28 are driven in synchronism from the oscillator 30. A portion of the output of demodulator 28 is fed back to the "one shot" oscillator 22, also as set forth above.

Figure 4:
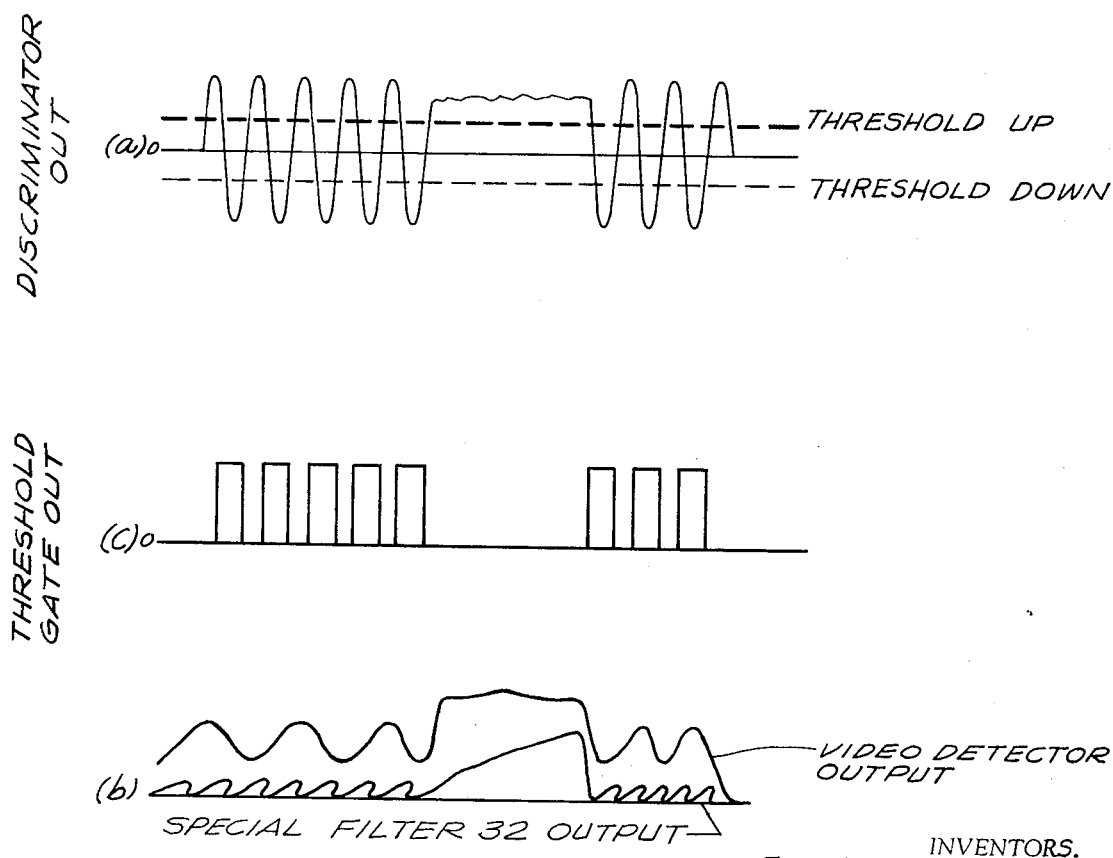
FIG. 4 is a series of graphs showing output signal characteristics at various points in the system.

The output of demodulator 28 is a signal whose waveform may be like that appearing at FIG. 4(a). Even with the discrimination provided by the "one shot" oscillator 22, various spurious noise signals, referred to as "reverberation," which may be greater in amplitude than the desired echo signal, do appear at the output of demodulator 28, and these are distinguishable primarily by their comparatively high frequency, or short duration, as compared with the desired echo return signal. Signals above the zero line represent so-called "up-doppler" or approaching objects, and signals below represent "down doppler" or receding objects (relative to the transducer 10). This output is supplied to the threshold gate 31 which is, or may be, a conventional gate of the type wherein no output is produced until the input signal reaches a desired value of a given polarity. This threshold valve may be chosen such that only "up doppler" signals representing velocities over 3 knots, for example, will be supplied to the special low pass filter 32. Alternatively, only "down doppler" signals could be used. Another choice is to divide the "up" and "down" doppler signals and separate from each signals representing velocities less than a given value in either direction through separate low pass filters such as filter 32, combining the remaining signals on an additive basis to increase sensitivity. Referring to FIG. 4(a), the "up doppler" threshold is shown with the heavy dotted line, and if this is used the threshold gate will normally pass only the signals below this line to the special low pass filter. If the "down doppler" threshold is used, as shown in the lighter dotted line, only signals above this line will appear at the input to filter 32.

Figure 3:
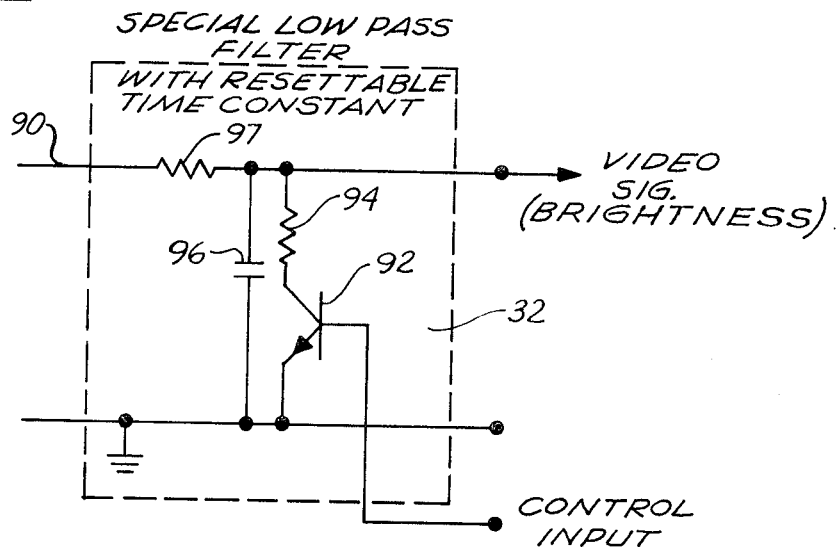
FIG. 3 is a schematic drawing of the special low pass filter circuit shown in block diagram in FIG. 1.

The special filter 32 is shown in schematic form in FIG. 3. On input lead 90 appears the video signal which represents the echo signal received at the transducer 10 as modified by the action of the band pass filter and the automatic gain control of the receiver 12 and the video detector 16. The waveform of this signal is similar to that appearing at FIG. 4(b) labeled "video detector." The output of the threshold gate is supplied to the base of a transistor 92 which is normally nonconducting. Transistor 92 is connected in series with a resistor 94 across the output of video detector 16 and in parallel with a capacitor 96. Output signals from video detector 16 through a resistor 97 tend to charge capacitor 96 to a voltage effective to brighten the cathode ray tube 33. When an input signal appears on the base of transistor 92, however, this transistor begins to conduct, thus discharging capacitor 96 to ground. With an input which is essentially like the pattern of FIG. 4(a) as diminished by the heavy threshold value (but inverted polarity—see FIG. 4(c)), the base of transistor 92 receives a series of short pulses representing the reverberation and other spurious signals, a period of effectively zero input, and another series of short pulses. When the short pulses are received, they cause transistor 92 to conduct, thereby discharging capacitor 96, and since the value of resistor 94 is chosen to permit this to occur rapidly, no substantial voltage can build up across capacitor 96. Only during the period of reception of the desired echo signal does the transistor 92 remain nonconducting for a time period sufficient to permit a charge to build up on capacitor 96 capable of brightening a spot of the face of the cathode ray tube 33. The output of filter 32 appears on the waveform of FIG. 4(b) labeled "SPECIAL FILTER 32 OUTPUT."

Operation of the system described can best be understood by considering the processing of typical input signals received at the transducer 10. One of the primary problems in sonar is in identifying or "classifying" the source of the numerous received pulses. Some of the pulses are not echo pulses but originate with underwater life; others are echo pulses but are reflected from the bottom, from underwater rocks and surface irregularities or other stationary objects. The primary purpose of the arrangement described herein is to eliminate all of the many signals appearing at the transducer except those representing objects of substantial size and having significant velocity.

The electrical signal appearing at the input of receiver 12 is a direct representation of the acoustic signal appearing at transducer 10 and includes a number of pulses constituting envelopes of the carrier frequency, some of which may be modified by doppler frequency effects, plus other noise. This input is modified in the receiver by action of the local oscillator, an automatic gain control circuit and a filter circuit which eliminates substantially all frequencies outside of the range of interest, essentially all of which constitute miscellaneous noise. Some of the receiver output is supplied to the video detector which removes the intermediate frequency carrier, supplying only the longer or envelope pulses to the special low pass filter 32. The receiver output is also supplied to the moving target indicator channel where it is processed in the mixer to remove the effect of the local oscillator signal and is amplified in the limiter to remove undesired amplitude effects since much of the noise may be greater in amplitude than the desired echo signal. This limited signal is then supplied to the frequency discriminator 21 which effectively removes all signals except those wherein the carrier frequency is such as to represent some significant velocity relative to the transducer 10. Reverberation, however, results in echo signals which contain a spectrum of frequencies, mostly clustered near the zero doppler or zero velocity frequencies, but some of which inevitably appear in the frequency range of interest, and these are passed by the frequency discriminator. They are, however, distinguishable on the basis of pulse length since the desired echo signals emanating from relatively large objects result in pulses of substantial length, while the reverberation from other sources, such as kelp, etc., appear as short pulses. Since the discriminator output is used to effectively short out or eliminate all video signals except those representative of large moving targets having velocities above a threshold value, the output from the threshold gate consists of a series of comparatively short pulses which cause transistor 92 to transmit to ground any charge built up on capacitor 96. During the period when a long echo pulse is received, there is no output from the gate 31, and the video signal transmits a brightness signal to the cathode ray tube 33.

While a single embodiment has been shown and described herein, it is recognized that modifications will occur to those skilled in the art. While special low pass filter 32 has been shown utilizing a single R-C section, a plurality of R-C or L-C filter sections may be used to effect a sharper roll-off characteristic. In such case the optimum results will be obtained by using a separate transistor to discharge each capacitor. As set forth above, the transducer signal could be supplied directly to the limiter amplifier where the signal processing afforded by the receiver is not required. Also, a number of different schemes may be used to determine the output signal characteristics of the threshold gate 31 depending upon desired use of "up doppler," "down doppler," or a combination of both. Other modifications may be made to suit specific requirements, and we do not desire to be limited to the specific embodiment shown, or otherwise except as established by the following claims.

We claim:

1. In a sonar receiving system including a transducer for receiving echo signals consisting of a series of pulses each containing many cycles of a nominal carrier frequency, a receiver, and electrical display means operatively connected to said receiver, circuit means for preventing display of echo signals other than those representing significant velocity of the reflecting object as represented by doppler shift in said carrier frequency, comprising frequency measuring means connected to said receiver including a monostable multivibrator, a time constant circuit including capacitance means connected to said multivibrator, means converting the output of said multivibrator to a variable voltage whose magnitude and polarity vary with the extent and direction of departure of the received signal frequency from said nominal carrier frequency, and feedback means connecting a portion of said variable voltage to said time constant circuit to vary the charging rate of said capacitance means, and means responsive to said variable voltage for controlling the signal flow from said receiver to said display means.

2. A sonar receiving system as set forth in claim 1 wherein said time constant circuit consists of a resistance-capacitance circuit connected to said monostable multivibrator and the portion of the variable voltage fed back to said time constant circuit effectively increases the frequency output of the monostable multivibrator when the frequency of the carrier is increased and decreases said frequency output when the frequency of the carrier is decreased.

3. A sonar receiving system as set forth in claim 1 wherein said multivibrator output converting means includes a bistable multivibrator connected to said monostable multivibrator, and means connecting the outputs of the active elements of said bistable multivibrator together to produce a differential output stage.

4. A sonar receiving system as set forth in claim 3 wherein amplification means is connected to receive the output of said differential output stage, said amplification means including an alternating current amplifier, a modulator and a demodulator, said modulator and demodulator operated in synchronism at the input and outputs of said alternating current amplifier.

5. A sonar receiving system as set forth in claim 1 wherein said means responsive to said variable voltage includes filtering means connected between said receiver and said display means including a low pass filter with a capacitor, switching means connected to discharge said capacitor when said switching means is conducting, and a threshold-responsive gate circuit operative to control the connection of said variable voltage to said switching means to cause conduction of said switching means.

6. A sonar receiving system as set forth in claim 1 wherein said means responsive to said variable voltage includes a reactance device, switching means connected to said reactance device to vary the time constant thereof, and a threshold-responsive gate circuit for controlling the connection of said variable voltage to said switching means to cause conduction of said switching means.

7. A sonar receiving system as set forth in claim 5 wherein said capacitor in said low pass filter is connected to be charged by the pulse output from said receiver, said switching means is a transistor connected in parallel with said capacitor, and said gate circuit has a threshold characteristic such that only signals representative of velocities below a desired value are connected to said transistor.

8. A sonar receiving system as set forth in claim 1 wherein said receiver includes a video detector and said electrical display means is a cathode ray tube, the said signal being effective to brighten a spot on said cathode ray tube.

9. For use with a sonar system in which the transmitted signal consists of a series of pulses made up of many cycles of a carrier frequency, a receiving system including a receiving transducer, a receiver for processing signals from said transducer, a detector circuit connected to said receiver, filtering means connected to said detector circuit, and electrically actuated display means connected to said filtering means;

characterized in that said receiving system incorporates means for preventing display of reflected signals other than those representative of significant velocity relative to said transducer, said means including a limiter and means connecting the received signal to said limiter, frequency measuring means connected to the output of said limiter including a monostable multivibrator, a time constant circuit connected to said multivibrator including capacitance means whose normal charging rate is such that said multivibrator normally produces output pulses at the carrier frequency of the transmitted signal, means converting the output of said time constant circuit to a direct current signal, means for amplifying said direct current signal and means feeding part of said signal back to said time constant circuit to vary the output frequency of said multivibrator, said feedback signal varying such that its polarity and magnitude vary with the direction of departure and magnitude of departure of the frequency of the received signal from said carrier frequency, a gate circuit connected to receive said feedback signal and to pass only those signals representative of velocities below a threshold value, said filtering means including capacitance means which is charged by the voltage from said detector and switch means responsive to output signals from said gate circuit to discharge said last named capacitance means.

10. In a sonar receiving system including a receiving transducer, a receiver, a detector circuit and electrically responsive display means:

circuit means for limiting the display to responses indicative of moving objects comprising a limiter and means connecting the received signal to said limiter, frequency discrimination means connected to the output of said limiter including a monostable multivibrator, a time constant circuit connected to said multivibrator including capacitance means whose normal charging rate is such that said multivibrator produces output pulses at the carrier frequency of the transmitted signal, means converting the output of said time constant circuit to a direct current signal such that its polarity and magnitude vary with the direction of departure and magnitude of departure of the frequency of the received signal from said carrier frequency, means for amplifying said direct current signal and means feeding part of said signal back to said time constant circuit to vary the output frequency of said multivibrator;

a gate circuit connected to receive said feedback signal and to pass only those signals representative of velocities below a threshold value, and filtering means interposed between said detector circuit and said display means and connected to said gate circuit, said filtering means including capacitance means which is charged by the voltage from said detector and switch means responsive to output signals from said gate circuit to discharge said last named capacitance means.

* * * * *